US012569398B2

(12) United States Patent
Binda et al.

(10) Patent No.: US 12,569,398 B2
(45) Date of Patent: Mar. 10, 2026

(54) ACTUATOR HANDPIECE FOR A NEUROMUSCULAR STIMULATION DEVICE AND CORRESPONDING NEUROMUSCULAR STIMULATION DEVICE

(71) Applicant: WINTECARE SA, Chiasso (CH)

(72) Inventors: Simone Luca Binda, Rezzago (IT); Claudio Freti, Balerna (CH)

(73) Assignee: WINTECARE SA, Chiasso (CH)

( * ) Notice: Subject to any disclaimer, the term of this patent is extended or adjusted under 35 U.S.C. 154(b) by 905 days.

(21) Appl. No.: 17/776,309

(22) PCT Filed: Nov. 13, 2020

(86) PCT No.: PCT/IB2020/060689
§ 371 (c)(1),
(2) Date: May 12, 2022

(87) PCT Pub. No.: WO2021/094990
PCT Pub. Date: May 20, 2021

(65) Prior Publication Data
US 2022/0401295 A1     Dec. 22, 2022

(30) Foreign Application Priority Data
Nov. 13, 2019    (CH) ........................................ 1442/19

(51) Int. Cl.
*A61H 23/00*      (2006.01)
*A61H 23/02*      (2006.01)
*H02K 33/16*      (2006.01)

(52) U.S. Cl.
CPC ......... *A61H 23/0218* (2013.01); *H02K 33/16* (2013.01); *A61H 2201/0153* (2013.01); *A61H 2201/0165* (2013.01); *A61H 2201/165* (2013.01)

(58) Field of Classification Search
CPC .... A61H 23/00; A61H 23/02; A61H 23/0218; A61H 2201/0153; A61H 1/0452;
(Continued)

(56) References Cited

U.S. PATENT DOCUMENTS 4,905,031 A  *  2/1990  Mody ...................... G03B 3/10
                                                            361/147
8,579,837 B1    11/2013  Makower et al.
(Continued)

OTHER PUBLICATIONS

International Search Report and Written Opinion from International Application No. PCT/IB2020/060689 mailed Mar. 1, 2021.

*Primary Examiner* — Margaret M Luarca
*Assistant Examiner* — Sarah B Lederer
(74) *Attorney, Agent, or Firm* — Ballard Spahr LLP

(57)                    ABSTRACT

An actuator handpiece for a neuromuscular stimulation device is described, said handpiece comprising: a head intended to come into contact with a body surface of a patient to be treated with a predetermined application frequency, said head being mounted on one end of a sliding rod having an opposite end provided with a magnet; a coil and an electronic board connected electrically to the coil and designed to generate a magnetic field for the alternating displacement of the magnet and therefore the head between a distal position, in which the head is intended to exert pressure on the body surface, and a proximal pressure-reducing or release position. A Teflon support structure of the coil is housed above a perforated steel plate situated in a plane defined inside a body of the actuator handpiece, the perforated plate being situated around a cylindrical wall of the support structure which, internally, defines a sliding seat for the magnet.

9 Claims, 5 Drawing Sheets

(58) Field of Classification Search
CPC .......... H02K 33/16; A61N 1/36; A61N 2/006;
A61N 2/02; A61N 2/12
See application file for complete search history.

(56) References Cited

U.S. PATENT DOCUMENTS

| | | | |
|---|---|---|---|
| 2004/0188903 | A1 | 9/2004 | Goto et al. |
| 2012/0259255 | A1* | 10/2012 | Tomlinson ......... A61H 23/0218 |
| | | | 601/46 |
| 2014/0163305 | A1* | 6/2014 | Watterson ................ A61N 2/12 |
| | | | 600/14 |
| 2016/0015596 | A1* | 1/2016 | Murison ................ A61H 19/44 |
| | | | 600/38 |
| 2016/0089296 | A1* | 3/2016 | Swart .................... A61H 23/04 |
| | | | 601/108 |
| 2019/0064927 | A1 | 2/2019 | Tachi et al. |

* cited by examiner

30a
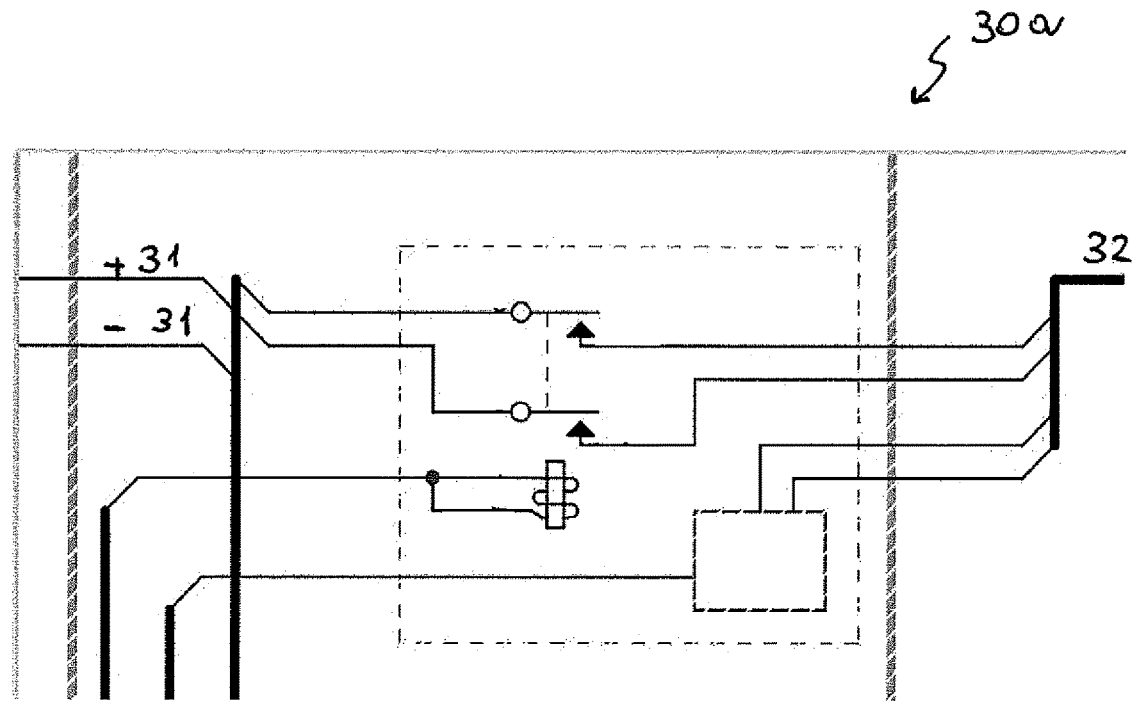
Fig. 3
1
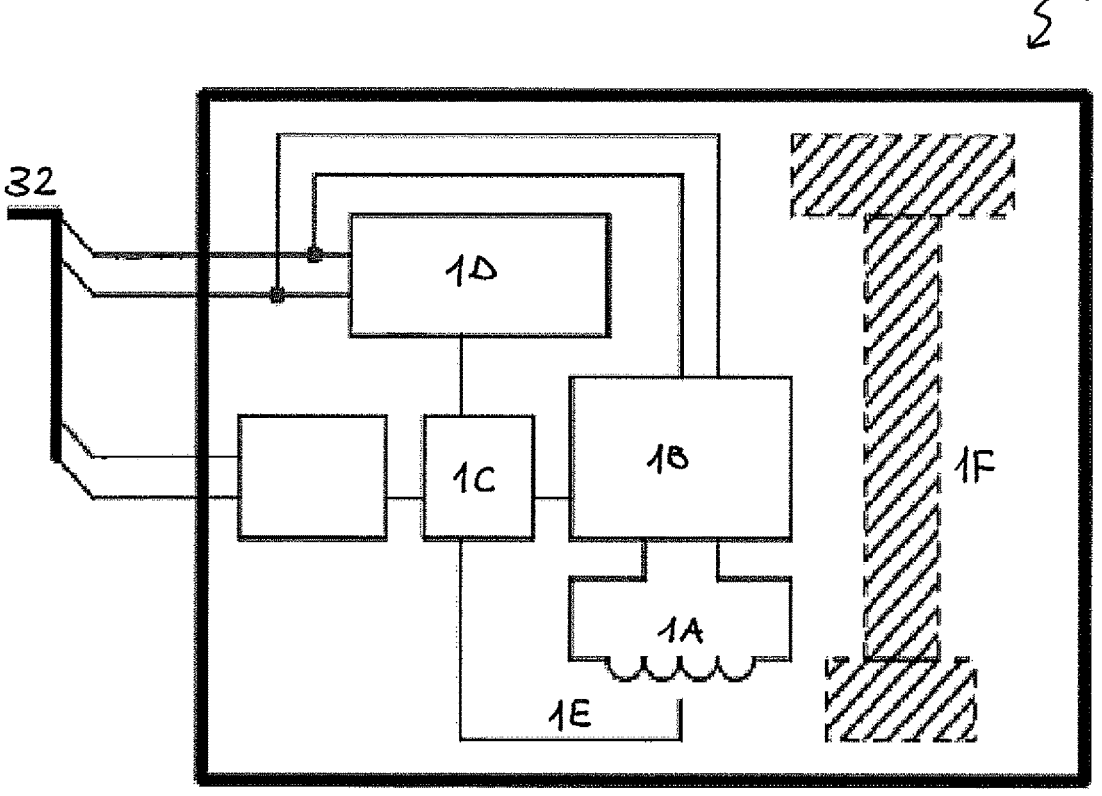
- Fig. 4 -

ACTUATOR HANDPIECE FOR A NEUROMUSCULAR STIMULATION DEVICE AND CORRESPONDING NEUROMUSCULAR STIMULATION DEVICE

TECHNICAL SECTOR

The present invention relates to an actuator handpiece for a neuromuscular stimulation device comprising a vibrating head intended to come into contact with a body surface of patient to be treated, with a predetermined application frequency.

In particular, the present invention relates to an actuator handpiece of the aforementioned type, in which the head is mounted on one end of a sliding rod having an opposite end controlled electronically between a distal position, in which the head exerts a pressure on the body surface, and a proximal pressure-reducing or release position.

The present invention also relates to a neuromuscular stimulation device comprising a dedicated vibrating head of the aforementioned type.

PRIOR ART

Actuator handpieces used in neuromuscular stimulation applications and intended to exert a pressure with a predetermined frequency on a body surface of a patient to be treated are known. In neuromuscular stimulation devices, the head of the actuator handpiece, which vibrates at a certain frequency and remains in contact with the body surface, mechanically exerts a pressure/pressure-releasing action on the skin which causes the deformation of mechanical receptors, also known as Pacinian corpuscles. The correct stimulation, in terms of frequency and intensity, of the mechanical receptors determines the efficiency of the neuromuscular stimulation treatment, since it determines the stimuli sent from the mechanical receptors to the central nervous system and therefore the consequent relaxing effect of the stimulation.

The vibration of the head is provided by axial sliding between a distal position corresponding to the pressure-exerting action and a proximal position corresponding to pressure release. The sliding movement is preferably associated with a square-wave frequency since it is preferable to alternate periods where a—for example constant—pressure is exerted (pressure-exerting action) with time periods during which no pressure is exerted or in any case a pressure substantially less than that of the pressure-exerting action, for example a pressure slightly higher than atmospheric pressure (pressure release).

This alternation determines the application frequency of the stimulation device by means of the handpiece. The frequency of the device is normally adjustable so as to focus the stimulation specifically on muscles to be treated, corresponding to the set frequency, in particular on neuro-motor control muscles, situated substantially at a certain depth from the body surface where the head is applied, thus achieving the relaxing tonification effect in an absolutely trauma-free manner.

The known actuator handpieces have, however, a number of drawbacks, which are mainly due to the components used. The head of the handpiece is mounted on the end of a rod sliding inside a seat formed in the body of the handpiece; the rod is associated, at an opposite end, with a metal body which is subject to the magnetic field of a coil electrically controlled by an electronic board. The electronic board is mounted in the electrotherapy device and is electrically connected to the coil by means of electrical connectors extending between the electrotherapy device and the handpiece.

Ideally, for correct neuromuscular stimulation, it is necessary to operate the metal body with a frequency preferably higher than 30 Hz and less than 300 Hz and exert a force of about 1.5 kg on the body surface of the patient to be treated. However, the operation of the metal body within the aforementioned parameters overheats the actuator handpiece to a temperature beyond acceptable limits, which may place the patient in danger, cause possible damage to the handpiece or in any case require the suspension of the treatment or the use of heat-dispersion means which however complicate the structure, the cost and the dimensions of the handpiece, and consequently its practicality in terms of use. The overheating is mainly caused by the friction between the rod and the body of the handpieces, at an opening of the handpiece which allows sliding of the rod, but also by the friction between the metal body and the respective sliding seat inside the body of the handpiece.

The solutions adopted nowadays are not optimal since they involve limiting the frequencies or the working pressure in order to avoid overheating, this however having negative effects on the quality of treatment because of the limited stimulus effect on the receptors.

The technical problem underlying the present invention is therefore to devise an actuator handpiece for a neuromuscular stimulation device which is both practical to use and extremely effective, i.e. being able to operate within the optimal frequency and intensity parameters, while avoiding overheating which is potentially damaging for the patient or for the electrical components, thereby overcoming all the limitations which are currently associated with the known actuator handpieces.

SUMMARY OF THE INVENTION

The underlying idea of the present invention is to use a magnet at the end of a sliding rod on which the actuator handpiece head is mounted and to provide, in the body of the handpiece, a Teflon sliding seat for the magnet. The Applicant has found that, with such a configuration of components, the magnetic field generated by a coil of the magnet is able to operate the magnet, and therefore the head, at an optimal frequency and intensity (pressure), without causing overheating.

On the basis of the aforementioned proposed solution, the technical problem of the present invention is solved by an actuator handpiece for a neuromuscular stimulation device comprising:

a head intended to come into contact with a body surface of a patient to be treated with a predetermined application frequency, characterized in that said head is mounted on one end of a sliding rod having an opposite end provided with a magnet, and in that the actuator comprises a coil and an electronic board connected electrically to the coil and designed to generate a magnetic field for the alternating displacement of the magnet and therefore the head between a distal position, in which the head is intended to exert pressure on the body surface, and a proximal pressure-reducing or release position, a Teflon support structure for said coil, said support structure being supported by a perforated steel plate situated in a plane defined in a body of the actuator handpiece, the perforated plate being situated around a cylindrical wall of the support structure which, internally, defines a sliding seat for the magnet.

Further aspects of the actuator handpiece and the neuromuscular stimulation device are provided with reference to the dependent claims and to some embodiments described in connection with the attached figures, provided in any case by way of a non-limiting example of the scope of protection of the invention.

BRIEF DESCRIPTION OF THE ATTACHED DRAWINGS

FIG. 3 is another detail of the block diagram of FIG. 1 relating to a relay interface between the electrical circuit of FIG. 1 and the actuator handpieces according to FIG. 1.

FIG. 4 is another detail of the block diagram of FIG. 1, relating to one of the actuator handpieces.

DETAILED DESCRIPTION OF THE INVENTION

Figure 5:
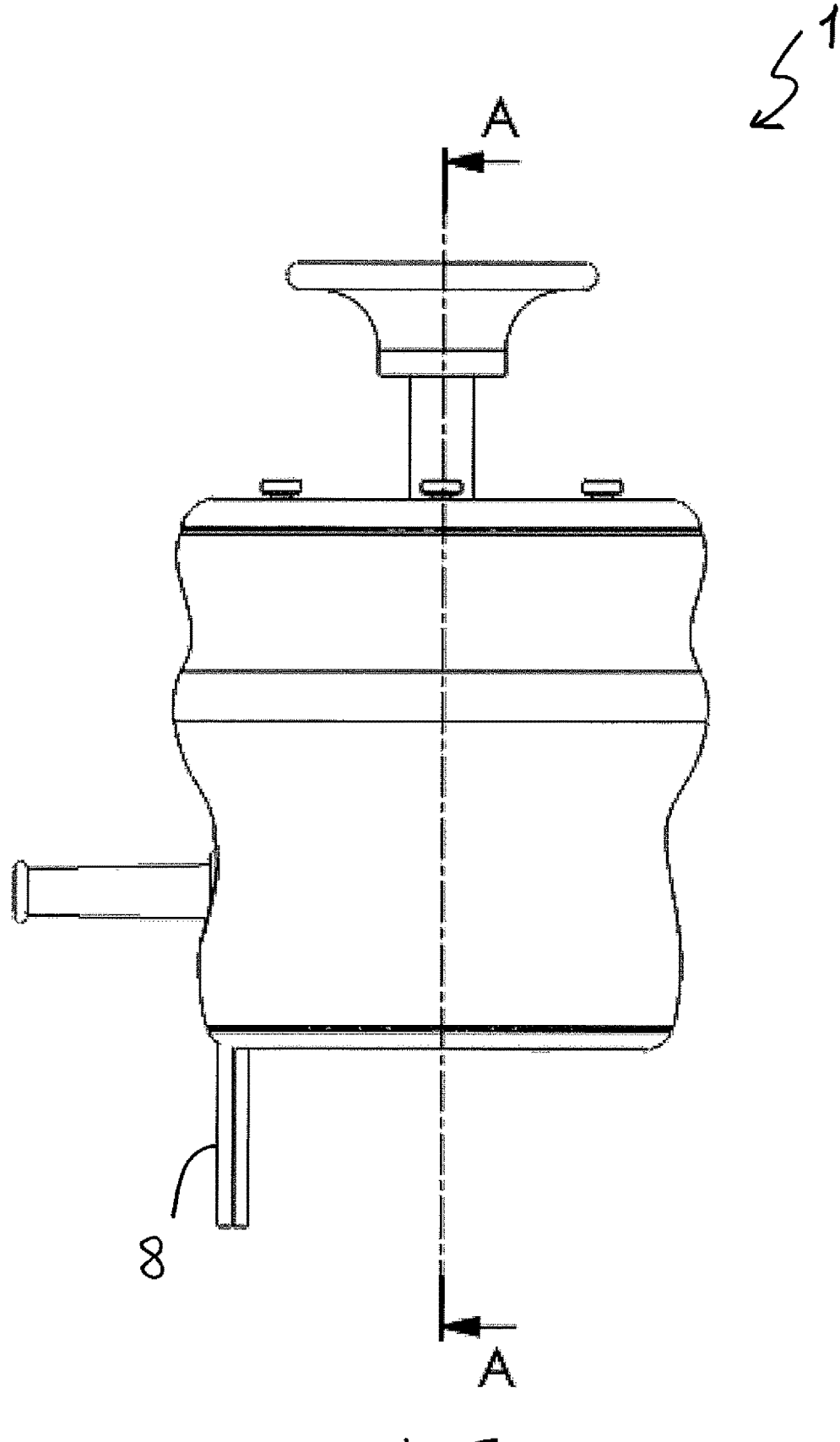
FIG. 5 is a front view of the actuator handpiece for a neuromuscular stimulation device, according to an embodiment.
Figure 6:
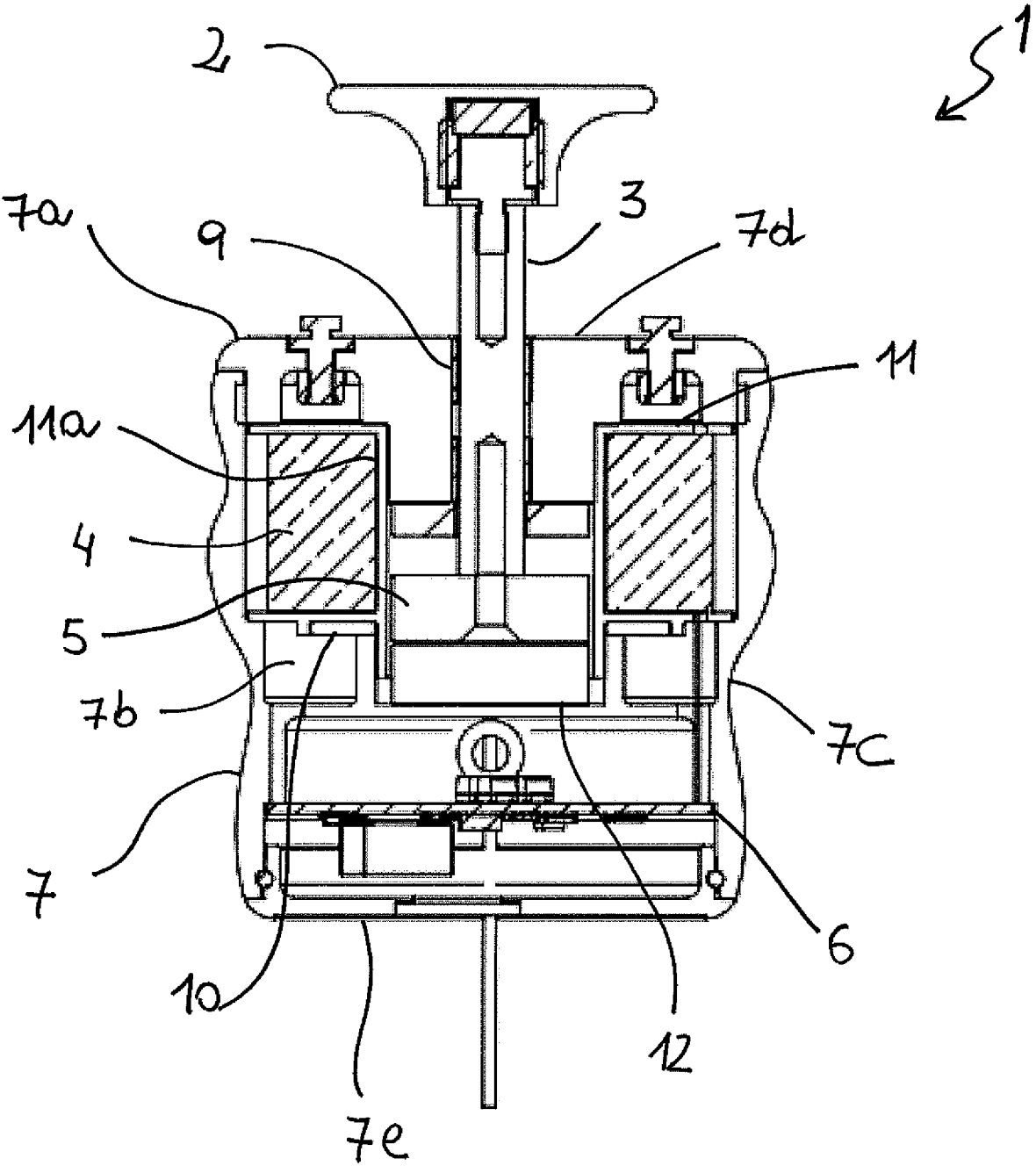
FIG. 6 is a cross-sectional view of the actuator handpiece according to FIG. 5.

With reference to the attached figures, first with reference to FIGS. 5 and 6 and then to the remaining FIGS. 1-4, an actuator handpiece and a neuromuscular stimulation device according to one embodiment are described below and indicated by the reference number 1 and 20, respectively.

The actuator handpiece 1 is intended to be applied so to make contact with the body of a patient and vibrate at a certain frequency, while remaining in contact with the body surface, so as to exert mechanically a pressure/pressure-releasing action on the skin which causes the deformation of the mechanical receptors which are also known as Pacinian corpuscles. The actuator handpiece 1 may operate in accordance with operating parameters which are ideal for the application in question (neuromuscular stimulation), namely with a frequency and intensity where the mechanical receptors respond in an optimum manner to the treatment, stimulating the central nervous system and therefore causing the optimum relaxation effect.

The vibration of the handpiece is associated with a square-wave frequency, which is electronically controlled, preferably PWM, whereby periods where a constant pressure is exerted (pressure-exerting action) are preferably alternated with so-called pressure-reducing periods where, in reality, the pressure is zero (there is nothing to prevent, during the pressure-reducing periods, a pressure less than that during the pressure-exerting step, for example atmospheric pressure, being exerted).

Figure 1:
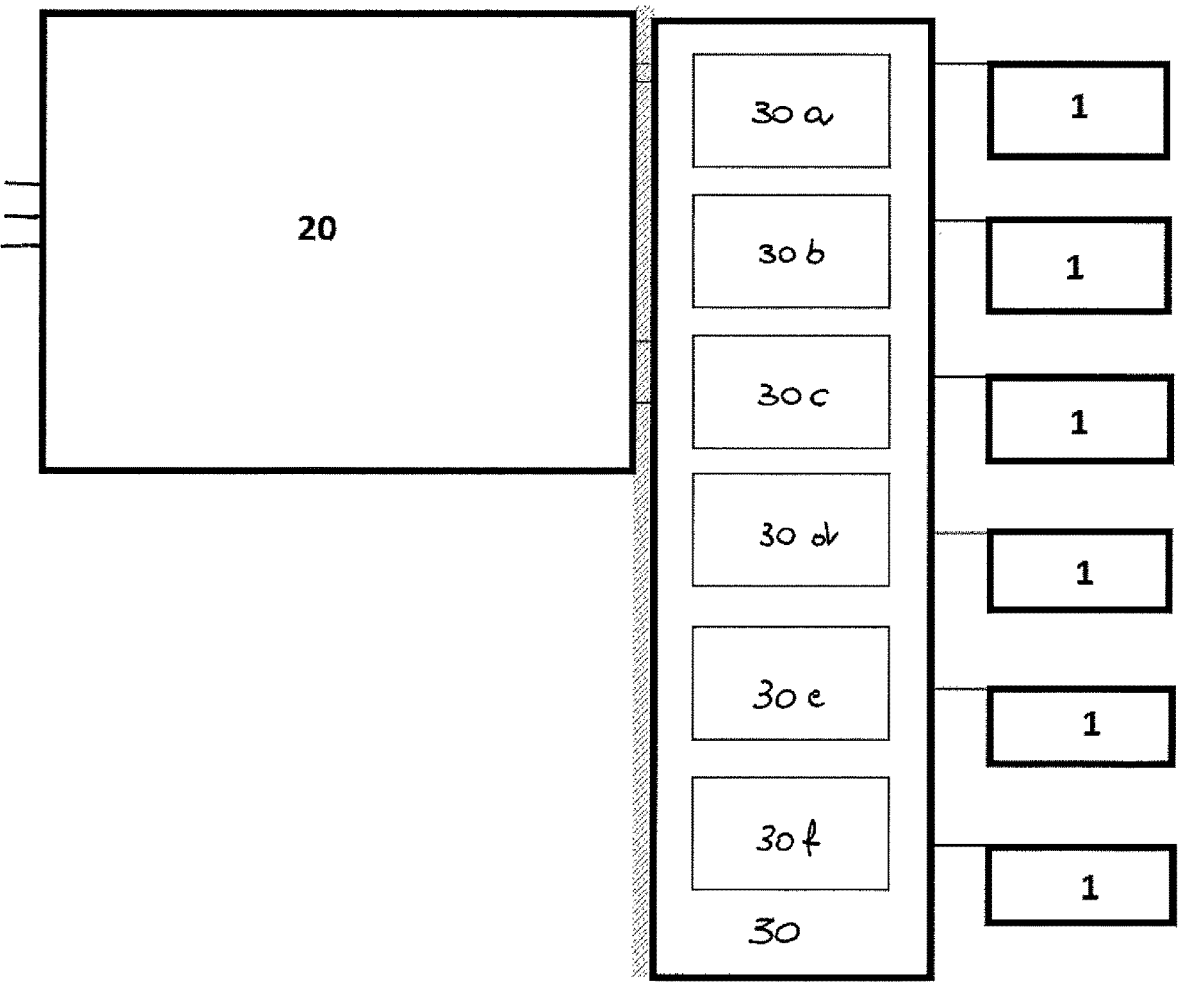
FIG. 1 is a block diagram of a neuromuscular stimulation device according to the present invention, provided with six actuator handpieces.
Figure 2:
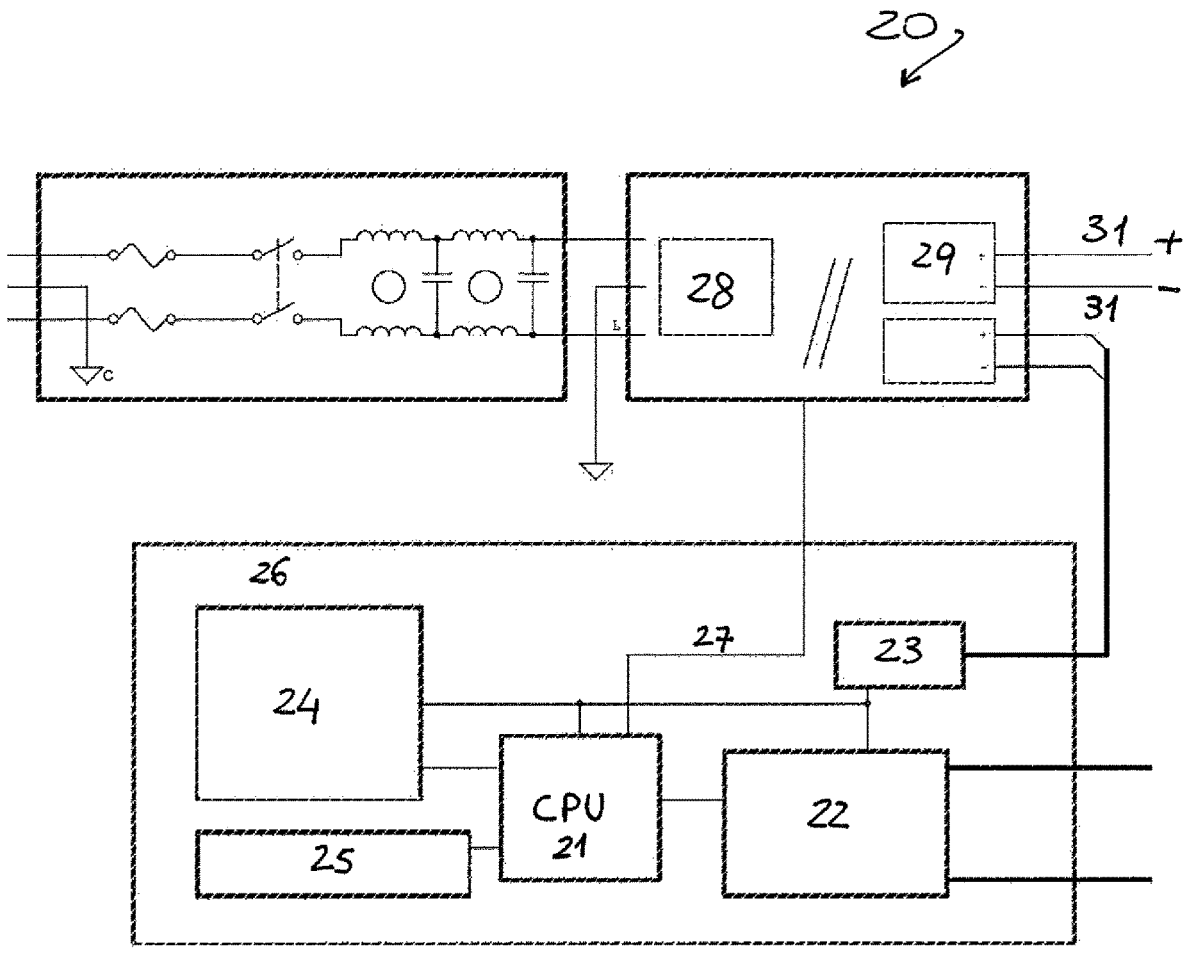
FIG. 2 is a detail of the block diagram of FIG. 1 relating to the electrical circuit of the neuromuscular stimulation device.

The vibration frequency of the actuator handpiece is adjustable in terms of frequency by means of the stimulation device 20 to which it is electrically connected by means of a relay interface (FIG. 1).

The vibration is caused by a head 2 which is intended to come into contact with a body surface of a patient to be treated with a predetermined application frequency and which is mounted on one end of a sliding rod 3 having an opposite end provided with a magnet 5, preferably made of neodymium.

The actuator handpiece comprises a coil 4 and an electronic board 6 connected electrically to the coil 4 and designed to generate a magnetic field (by means of the coil) for the alternating displacement of the magnet 5 and therefore the head 2 between a distal position, in which the head 2 is intended to exert pressure on the body surface, and a proximal pressure-reducing or release position.

A Teflon support structure 11 for the coil 4 is supported by a perforated steel plate 10 situated in a plane 7b defined in a body 7 of the actuator handpiece 1, the perforated plate 10 being arranged around a cylindrical wall 11a of the support structure 10 which, internally, defines a sliding seat for the magnet 5. The perforated plate 10, which may also be a washer 10, and the surface of the magnet situated opposite to the surface facing the rod 3 are substantially aligned, in particular coplanar, if the rod 3 is retracted inside the body (pressure release step). Basically, in the minimum extension position of the magnet, the plate surrounds the magnet, at its base. A wall of the Teflon structure is arranged between the plate and the magnet.

The handpiece may be manually supported on the body surface of the patient or by means of a band 8 intended to keep the body 7 of the handpiece tightly pressed on the body surface, in particular to keep the body 7 tightly pressed with its surface 7a which is associated with the sliding rod 3 directed towards the body surface of the patient. The band 8 is adjustable on the body of the patient so as to have a predefined tension, and the displacement of the head 2 into the distal position is designed to generate on the body surface of the patient a pressure of between 1000 g and 2000 g, preferably 1500 g, in the distal pressure-exerting position, with the band adjusted to the predefined tension.

According to further measures designed to reduce the friction and therefore the operating temperature, the actuator handpiece comprises at least one sintered bush 9 having an external component situated inside a receiving seat defined inside the body 7 of the handpiece and an internal component inside which the rod 3 is slidable. Basically, the receiving seat is at an opening through which the rod projects outside of the handpiece.

An end-of-stroke damping member 12 is situated inside another dedicated receiving seat provided in the body 7 of the handpiece, said dedicated receiving seat being defined underneath the magnet 5. The magnet 5 is intended to come into contact with the end-of-stroke damping member 12 and, preferably, the damping member 12 is made of a closed-cell silicone material, this allowing the friction to be further reduced and therefore preventing undesirable temperature increases or slower stroke movements which would prevent the optimum operating frequency being reached, using the desired components (i.e. suitable for limiting the dimensions of the actuator handpiece).

The predetermined application frequency may be configured by means of the electronic board within a range of between 30 Hz and 300 Hz. The alternating movement of the magnet 5 and the head 2 has a travel stroke of between 0.5 and 2.5 mm, and preferably equal to 1.5 mm. The actuator handpiece was tested at the aforementioned working frequencies (30 Hz and 300 Hz) for long operating periods, without encountering increases in temperature above a safety threshold.

In one embodiment, the body 7 of the actuator handpiece 1 comprises a substantially cylindrical and hollow component 7c, a lid 7d and a base 7e applied to the opposite openings of the hollow cylinder 7c. The lid 7d delimits a sliding seat of the rod 3 (where the sintered washers are applied) and a profile for application to the Teflon support structure 11, making contact with the support structure along a surface perpendicular to the cylindrical surface.

The substantially cylindrical and hollow component 7c has an outer surface with at least two curved points which facilitate manual gripping.

The winding of the coil consists of copper, preferably category F copper. The sliding rod is made of Drilyn EN AW6061/6060. The neodymium is preferably neodymium 35SH.

Some technical specifications of the actuator handpiece according to an embodiment are shown in the Table below.

sub-interface 30a is represented schematically in FIG. 3 in which it is possible to see the output line 31 of the device 20 (which enters the interface 30) and the output line 32 of the interface 30a, which is the input line of the actuator handpiece 1, shown in more detail in FIG. 4.

The winding of the coil is indicated by 1a in FIG. 4, a DC inverter by the reference number 1b, the DC power unit by 1d, and a microprocessor by 1c having a line for controlling the operating temperature 1e. The mechanical parts of the actuator (rod, magnet, head) are schematically indicated by 1F.

Advantageously the actuator handpiece according to the present invention is able to perform optimal stimulation of

| | | | Neodymium Dia. 30 mm × dia. 5.3 mm × 10 mm | | |
|---|---|---|---|---|---|
| | | | SI | CGS | |
| Form | diameter | D | 30 mm | 3 cm | |
| | internal diameter | ID | 5.3 mm | 0.53 cm | |
| | subtitle | S | 10.7 mm | 1.07 cm | |
| | height | H | 10 mm | 1 cm | |
| | magnetization direction | M | Axial | | |
| Operating environment | temperature | T | 20° C. | 68° F. | |
| Magnetic characteristics | superficial density of the magnetic flux | B | 331.43 mT | 3314.3 G | |
| | adhesive force | F | 13.66 kgf | 13660 gf | |
| | density of the magnetic flux at the load point | Bd | 583.35 mT | 5383.5 G | |
| | total flux | Dia o | 0.00038054 Wb | 38054 Mx | |
| | performance coefficient | Pc | 0.86 Pc | — | |
| | maximum temperature of use | Tw | 150° C. | 302° F. | |
| Property of the material | material | Neodymium | 35SH | | |
| | residue | Br | 1195 mT | 11950 G | |
| | coercivity | Hcb | ≥876 kA/m | ≥11.0 kOe | |
| | intrinsic coercivity force | Hcj | ≥1592 kA/m | ≥20 IkOe | |
| | maximum energy | BH | 263-287 kj/m3 | 33-36 MGOe | |
| | temperature | Br | −0.1%/C. | 31.82%/° F. | |
| | coefficient | Hcj | −0.49%/C. | 31.118%/° F. | |
| | heat resistance (T) | Tw | ≤150° C. | ≤302° F. | |
| | Curie temperature | Tc | 340° C. | 644° F. | |
| | density | ρ | 7.5 kg/m3 | — | |
| | weight | Net | 0.0514 kg | 51.3597 g | |

The invention also relates to a neuromuscular stimulation device to which the aforementioned handpiece is removably connected and in particular to a device removably connected to at least two actuator handpieces 1. The handpieces may be simultaneously operated, at the same or different frequencies and intensity levels and applied by means of the bands 8 to different parts of the patient's body which require, respectively, the same or different treatment frequencies and intensity (pressure) levels.

FIG. 1 is a block diagram which shows in schematic form the device 20, a relay interface between the device 20 and the actuator handpieces 1, preferably incorporated in the device 20, and the actuator handpieces 1. The electrical circuit of the device 20 is shown schematically in FIG. 2 and comprises a CPU 21, a serial interface 22, a DC power supplier 23, a display unit 24 and an interface 25, preferably on a same board 26. An ON/OFF line 27 allows switching on or switching off of a power supplier provided with an AC inlet block 28 and with a DC power unit 29 which is connected to the interface 30 by means of an output line 31.

The interface 30 is provided with several sub-interfaces 30a-30f (FIG. 1) for the respective actuator handpieces 1. A the mechanical receptors in the human body, even if situated at different depths and sensitive to different frequencies.

The stimulation efficiency which may be obtained by the handpiece is also associated with the possibility of applying high pressures (forces), varying the application frequency on different points of the body during the same therapy and broadening the treatment function, which may cover a wide range of treatments from relaxation to the treatment of pain or the improvement of motor control.

On the other hand, the instruments according to the prior art are able to exert a high pressure only at a low frequency and are unable to support the simultaneous application of different application frequencies on different points of the body.

The handpiece and the neuromuscular stimulation device according to the present invention overcome effectively all the limitations of the apparatus according to the prior art, supporting also precise calibration of the frequency based on 1 Hz variations which make the device suitable both for treatment and for clinical assessment, where the variation in skin sensitivity at different frequencies and pressures is an indicator of the receptive state of the nerve endings which signal neuropathic phenomena. Therefore, the use of the handpiece and the neuromuscular stimulation device, unlike all the known devices, may be extended also to the area of diagnostics.

The invention claimed is:

1. An actuator handpiece for a neuromuscular stimulation device, the actuator handpiece comprising:

a head intended to come into contact with a body surface of a patient to be treated with a predetermined application frequency;

a sliding rod having one end with the head mounted thereto and having an opposite end provided with a magnet;

a coil;

an electronic board connected electrically to the coil and designed to generate a magnetic field for alternating displacement of the magnet and therefore the head between a distal position, in which the head is intended to exert pressure on the body surface, and a proximal pressure-reducing or release position; and a Teflon support structure for said coil, said Teflon support structure being supported by a perforated steel plate situated in a plane defined in a body of the actuator handpiece, the perforated plate being situated around a cylindrical wall of the support structure which, internally, defines a sliding seat for the magnet, wherein said body includes a substantially cylindrical and hollow component, a lid, and a base applied to the opposite openings of the hollow cylindrical component, said lid delimiting a sliding seat for the rod and a profile for application to the Teflon support structure, which makes contact with the support structure along a surface perpendicular to the cylindrical surface.

2. The actuator handpiece of claim 1, further comprising at least one sintered bush having an external component situated in a receiving seat defined inside the body of the handpiece and an internal component inside which the rod is slidable.

3. The actuator handpiece of claim 1, further comprising an end-of-stroke damping member situated inside a receiving seat in the body of the handpiece, said receiving seat being defined below the magnet and said magnet being intended to come into contact with said end-of-stroke damping member, said damping member being made of a closed-cell silicone material.

4. The actuator handpiece of claim 1, wherein said predetermined application frequency can be configured by means of the electronic board within a range of between 30 Hz and 300 Hz.

5. The actuator handpiece of claim 1, wherein said alternating displacement of the magnet and the head has a travel stroke in a range from 0.5 to 2.5 mm.

6. The actuator handpiece of claim 5, wherein the travel stroke is 1.5 mm.

7. The actuator handpiece of claim 1, wherein said magnet includes neodymium.

8. The actuator handpiece of claim 1, wherein the substantially cylindrical and hollow component has an outer surface with at least two curved points.

9. A neuromuscular stimulation device comprising at least two actuator handpiece each of which is configured as the actuator handpiece of claim 1.

* * * * *